United States Patent [19]
Froehlich et al.

[11] Patent Number: 5,949,024
[45] Date of Patent: Sep. 7, 1999

[54] CABLE SLEEVE

[75] Inventors: Franz Froehlich, Hagen; Rainer Zimmer, Schalksmuehle, both of Germany

[73] Assignee: RXS Kabelgarnituren GmbH, Hagen, Germany

[21] Appl. No.: 08/967,886

[22] Filed: Nov. 12, 1997

[30] Foreign Application Priority Data

Nov. 21, 1996 [DE] Germany ............... 196 48 291

[51] Int. Cl.$^6$ ................................. H02G 15/04
[52] U.S. Cl. ........................... 174/77 R; 174/93
[58] Field of Search ..................... 174/77 R, 93

[56] References Cited

U.S. PATENT DOCUMENTS 3,156,887  11/1964  Weikal ..................... 174/77 R X

FOREIGN PATENT DOCUMENTS

| 40 35 557 | 5/1992 | Germany . | |
| 1379806 | 3/1988 | U.S.S.R. | 174/77 R X |
| 1603472 | 10/1990 | U.S.S.R. | 174/77 R X |

*Primary Examiner*—Dean A. Reichard
*Attorney, Agent, or Firm*—Hill & Simpson

[57] ABSTRACT

A cable sleeve formed of an envelope member with an attached flange against which a seal system composed of an annular seal is pressed with the assistance of a straining ring. The annular seal is composed of an elastomer with a Shore hardness of 40° to 70° and has its encompassing inner region inserted as a channel seal into the seal channel of a seal member.

6 Claims, 5 Drawing Sheets

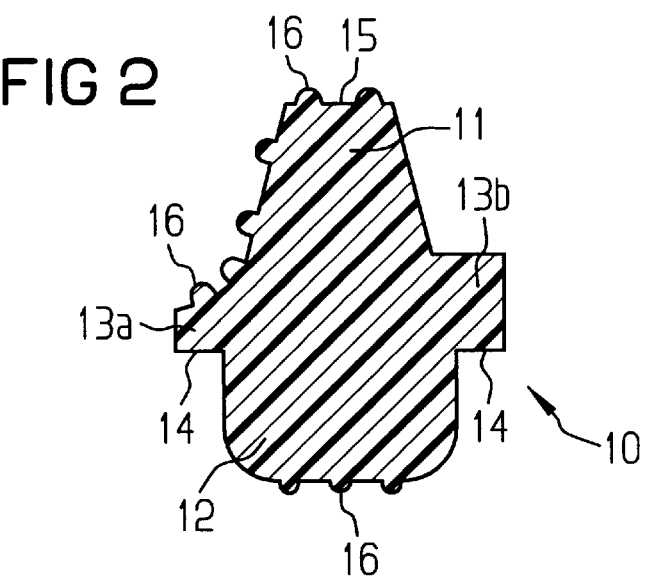
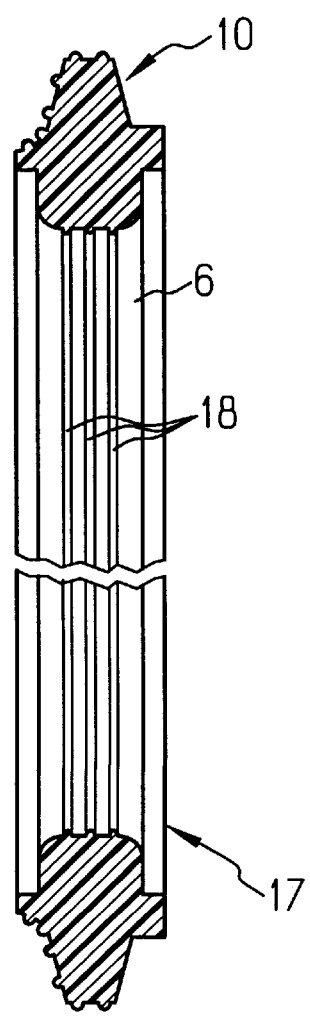

CABLE SLEEVE

BACKGROUND OF THE INVENTION

The invention is directed to a cable sleeve composed of an envelope member and at least one known seal member with a seal channel that goes completely around, and an annular seal, the seal end of the envelope member comprising an outwardly directed, encompassing and conically bevelled flange that, together with the seal, is embraced by a straining ring that comprises an inwardly directed channel with conical sidewalls.

DE 40 35 557 A1 discloses a hood sleeve that is composed of a tubular envelope member and—at least one end—of a known disk-shaped seal member having cable introduction seals. The seal member is provided with an adapter that is introduced into the seal channel of the seal member on the one hand and, on the other hand, is pressed in sealing fashion against a conically projecting flange of the envelope member with the assistance of a straining ring, whereby a seal ring must be additionally inserted. A plurality of discrete parts must thus be combined here to form the seal system.

SUMMARY OF THE INVENTION

An object of the present invention is to create a cable sleeve with a seal system between a seal member of a known type and the flange of an envelope member which is composed of as few individual parts as possible in the seal region, and which is therefore especially easy to assembly and functionally dependable.

According to the invention, a cable sleeve of the type initially set forth is provided wherein the annular seal is composed of a channel seal that fills out the seal channel of the seal member, and of a flange seal that dips into the channel of the straining ring and that is matched to the sidewall of the flange of the envelope member. At least one encompassing supporting ring is designed between the channel seal and the flange seal. The annular seal is composed of an elastomer having a Shore hardness of 40° to 70°.

The particular advantage in the seal system of the cable sleeve of the invention is that first and foremost, the annular seal is designed and is so shape-stable despite its elasticity that it can take over the necessary mechanical hold as well as the sealing function between the seal member and the flange of the envelope member in the seal system. This annular seal, as a single formed member, is composed of a channel seal and of a flange seal, whereby the channel seal dips into the encompassing seal channel of the seal member, and the flange seal has its sealing surface matched with and facing toward the flange of the envelope member. The flange seal of the annular seal and the flange of the envelope member are brought together in a conical channel of the encompassing straining ring and are pressed against one another in sealing fashion by tensing the latter. During this closing operation, moreover, the annular seal is pressed overall into the encompassing seal channel of the seal member in sealing fashion. The annular seal is composed of an elastomer that exhibits a Shore hardness of 40° to 70°, so that the required mechanical shape stability is established. For this reason, no further component parts, as can be seen in the Prior Art, are required for the stabilization of the seal system.

BRIEF DESCRIPTION OF THE DRAWINGS

FIG. 2 shows a first annular seal of the invention in cross-section;

FIG. 3 shows the utilization of the seal according to FIG. 2 in the seal member;

DESCRIPTION OF THE PREFERRED EMBODIMENTS

Figure 1:
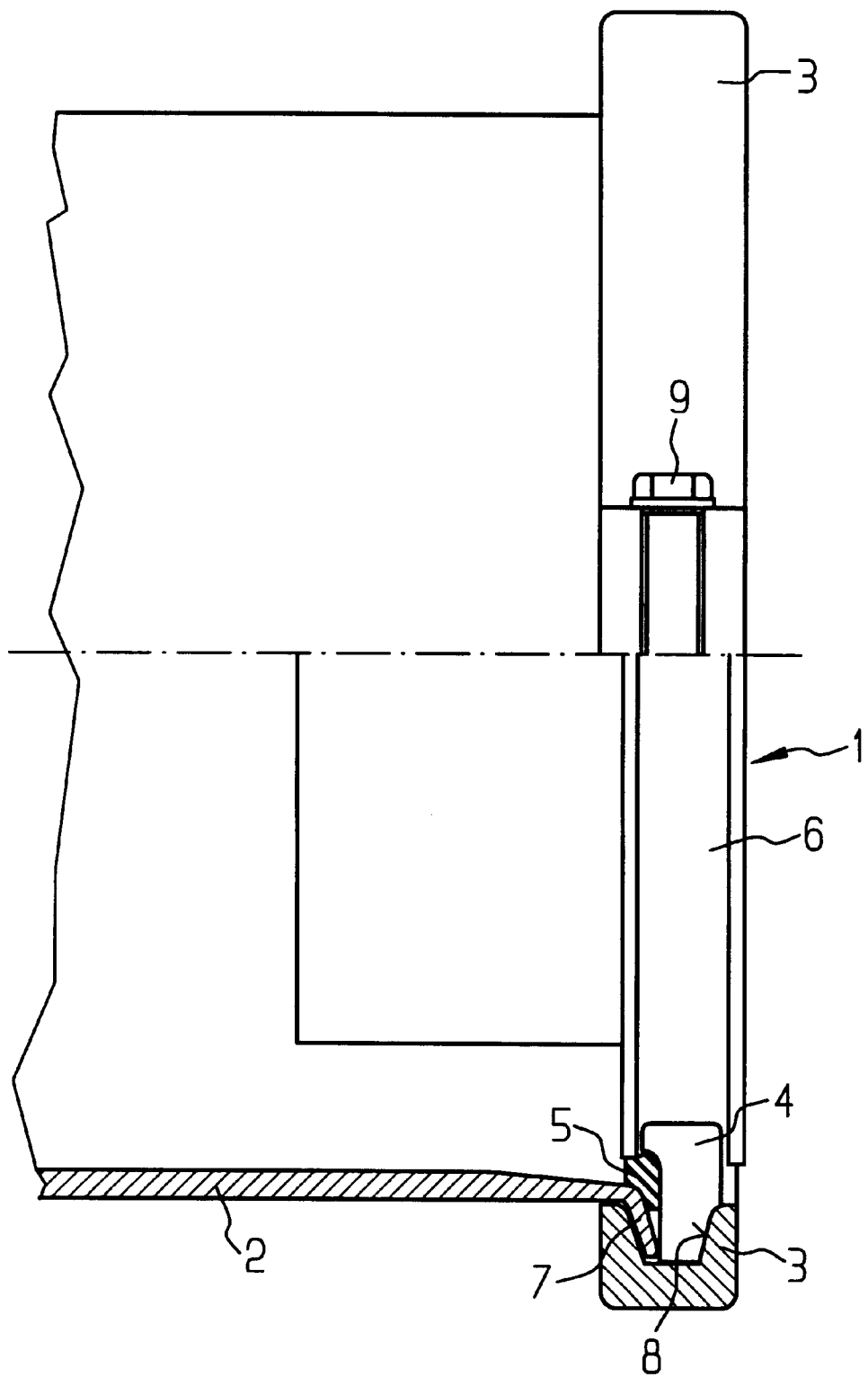
FIG. 1 shows the Prior Art.

FIG. 1 shows a known cable sleeve in its end-face seal region, whereby the seal member 1 at the end of the envelope member 2 is pressed in sealing fashion against a flange 7 with the assistance of a straining ring 3. The known seal member 1 has an encompassing seal channel 6 in which a corresponding adapter 4 must be introduced in order to be able to convert the originally radially acting seal system to the required axial seal system. A seal ring 5 is inserted between this adapter 4 and the flange 7, the seal being then assured by this seal ring 5. The pressing power required therefor is achieved by closing the straining ring with the assistance of a closing mechanism 9, whereby the pressing occurs on the basis of the wedge-shaped channel 8 within the straining ring 3. Several discrete parts that must be carefully joined inside one another in order to produce the seal are thus required in this Prior Art.

FIG. 2 illustrates the crossection of an annular seal 10 with which the required seal in the closure region between the known seal member and the flange of an envelope member can be undertaken according to the invention as a result of its shaping and its inherent stability. It is thereby important that the annular seal 10 is composed of a material that exhibits properties that meet both the sealing demands as well as the stability demands. An elastomer, for example silicone, that exhibits a Shore hardness of 40° to 70°, preferably 50° to 70°, is thus employed as material for the seal. The crossection shows the one-piece seal 10 in which a plurality of function parts are contained. Thus, the inner part of the annular seal 10 serves as channel seal 12 that is let into the encompassing seal channel of the seal member. This is followed by two encompassing supporting rings 13a and 13b at whose inwardly directed surfaces 14 the entire seal 10 is supported on the edges of the seal channel of the seal member. The adapted flange seal 11 then rises proceeding therefrom, the one sealing surface thereof being adapted or matched to the conically proceeding shape of the flange of the envelope member. The upper end 15 and the second lateral surface of the flange seal 11 is adapted to the channel sidewall of the straining ring 3 since this side lies directly in the channel of the straining ring. For increasing the sealing effect, encompassing seal springs 16 can be additionally applied in the sealing surfaces.

FIG. 3 shows the utilization of the annular seal 10 in the seal channel 6 of the known seal member 17. As indicated, the seal channel 6 can also be provided with grooves 18 for the acceptance of the seal springs 16 of the seal 10 under certain circumstances, but this is not compulsory when the elasticity is correspondingly matched.

Figure 4:
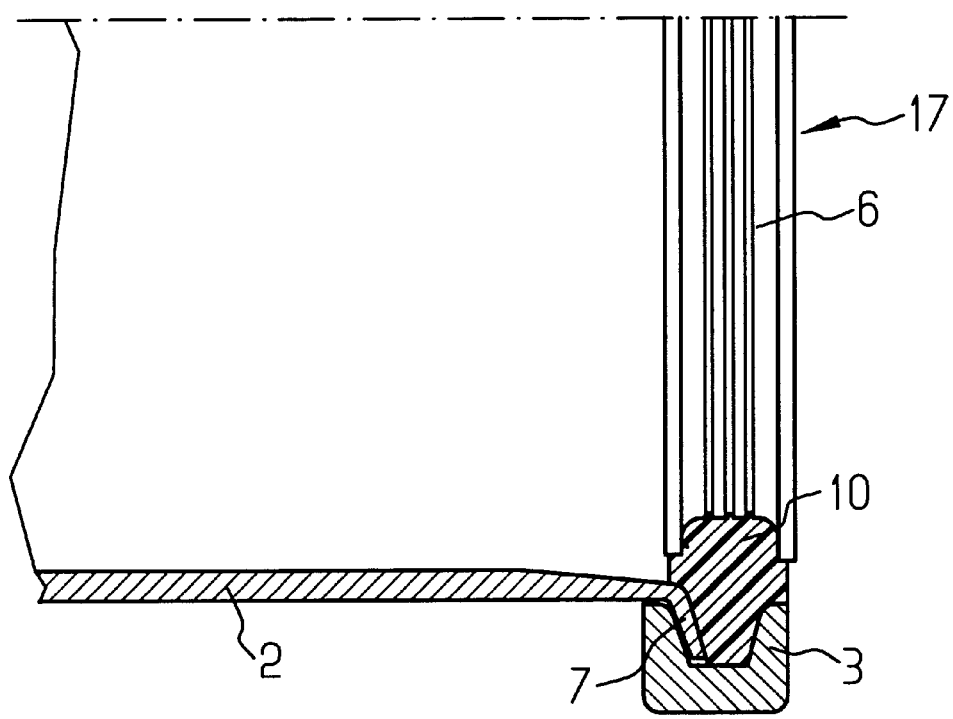
FIG. 4 illustrates the seal region of the cable sleeve.

The interaction of the individual parts in the seal region of the cable sleeve can be seen in partial section in FIG. 4. It is thus clear that the encompassing flange 7 of the envelope member 2 and the seal 10 are pressed together in sealing fashion in the channel of the straining ring 3, whereby the assembly has been facilitated compared to the Prior Art and the dependability has been enhanced. The matching of the seal with respect to shape, stability and tightness is optimum here, so that only one component is now required as a seal. The conversion of the radial seal into an axial seal thus occurs on the basis of the seal 10 of the invention.

Figure 5:
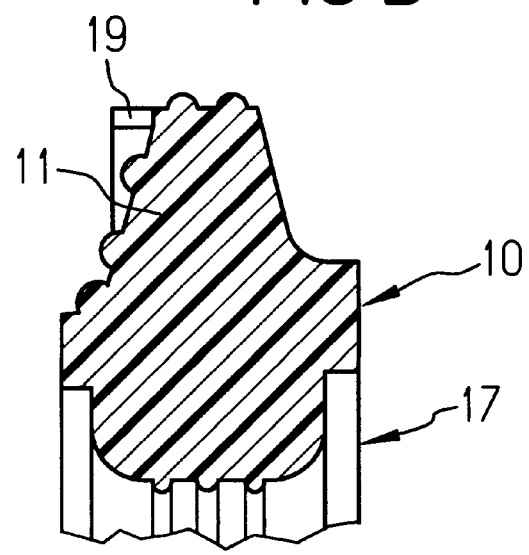
FIG. 5 shows an exemplary embodiment of FIG. 2 with an additional sealing lip.

FIG. 5 shows the described seal 10 that is additionally provided with an encompassing sealing lip 19 here in the part of its flange seal 11 in order to be able to enhance the sealing action relative to the flange as needed.

Figure 6:
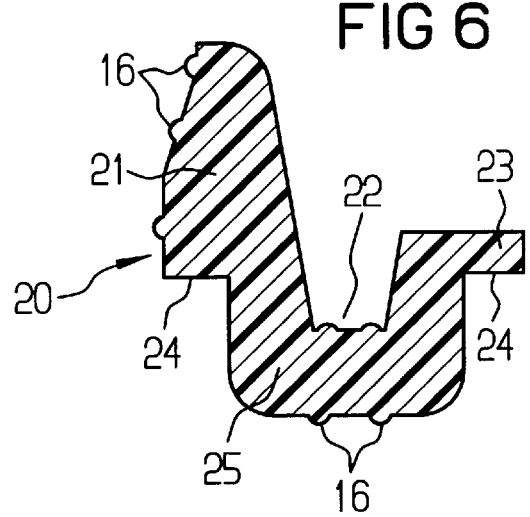
FIG. 6 shows a second exemplary embodiment of an annular seal.

FIG. 6 shows a second exemplary embodiment of a seal 20 of the invention with which the demands for tightness and stability are likewise met in the way already described. This is likewise a matter of a one-piece seal 20 whose basic form exhibits a U-shaped cross-section, whereby one U leg is designed as a flange seal 21, and the base of the U together with the second U leg are designed as a channel seal 25. The flange seal 21 again has its surface facing toward the flange matched to the flange form of the envelope member, whereas the contours of the channel seal 25 correspond to the channel form of the known seal member, so that the same conditions as in the first exemplary embodiment are valid with respect thereto. Here, the encompassing, applied supporting rings 23 with their inwardly directed surfaces 24 for supporting the seal 20 on the edges of the seal channel of the seal member are formed by the corresponding shoulders or are angled off in an outward direction. During assembly, a channel edge of the straining ring engages into the interspace 22 of the U-shaped seal 20 between the two U-legs, and thus lends additional strength in the seal region.

Figure 7:
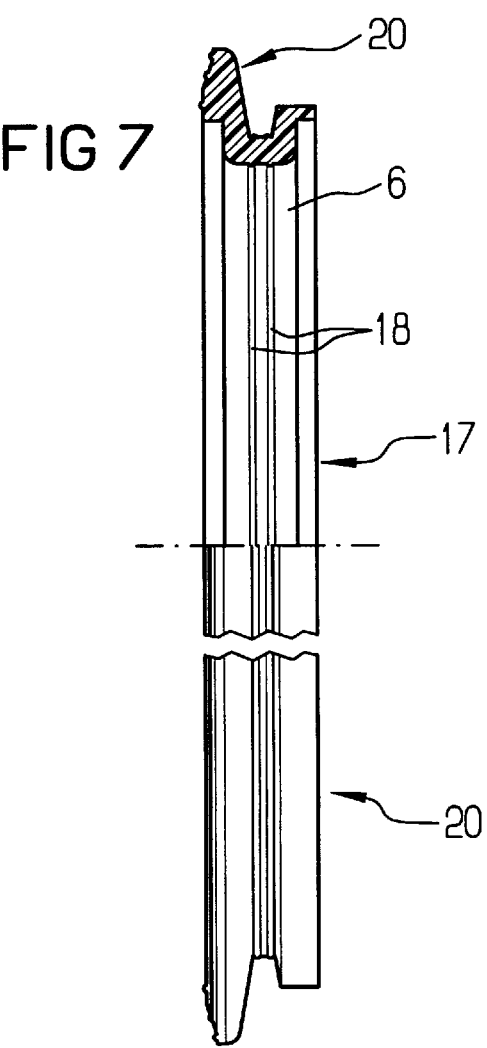
FIG. 7 shows the seal of FIG. 6 in the seal member.

FIG. 7 illustrates the employment of the seal 20 of FIG. 6 in the sealing channel 6 of the known seal member 17, whereby the upper part shows a crossection and the lower part shows the exterior profiling of the seal 20.

Figure 8:
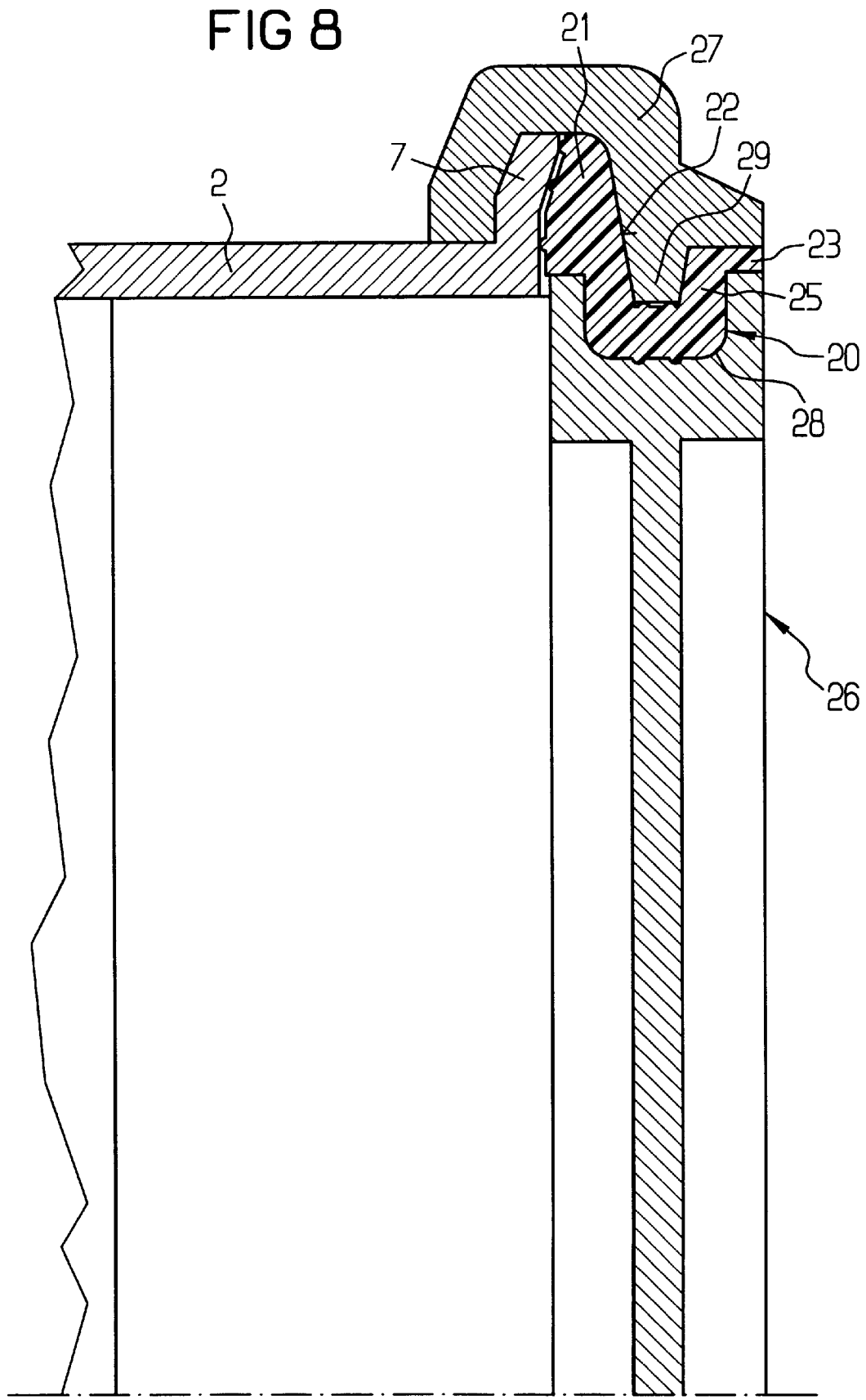
FIG. 8 shows the mounted or assembled seal of FIG. 6 in the seal region.

FIG. 8 shows the annular seal 20 in the assembled condition in the seal region of the cable sleeve. It becomes clear here that the seal 20 is pressed in the seal channel 28 of the seal member 26, whereby the applied supporting ring 23 is pressed in between the edge of the seal channel 28 and a formed-out portion of the straining ring 27. One channel edge of the straining ring 27 embraces the flange 7 of the envelope member 2 at the one side and the second channel edge thereof engages as spring 29 into the interspace 22 between the two U-shaped legs of the annular seal 20 and produces the actual mechanical hold. The elastomeric material employed for this embodiment preferably exhibits a Shore hardness from 40° to 60°.

Although various minor changes and modifications might be proposed by those skilled in the art, it will be understood that our wish is to include within the claims of the patent warranted hereon all such changes and modifications as reasonably come within our contribution to the art.

We claim:

1. A cable sleeve, comprising:
    an envelope member and at least one seal member with a completely around seal channel and an annular seal;
    a seal end of the envelope member comprising an outwardly directed, encompassing and conically bevelled flange that, together with the seal, is embraced by a straining ring that has an inwardly directed channel with conical sidewalls;
    the annular seal being formed of a channel seal that fills out the seal channel of the seal member and of a flange seal that dips into the channel of the straining ring and is matched to a sidewall of the flange of the envelope member;
    at least one supporting ring between the channel seal and the flange seal; and
    the annular seal being formed of an elastomer having a Shore hardness of 40° to 70°.

2. A cable sleeve according to claim 1 wherein surrounding seal springs are arranged at sealing surfaces of the annular seal.

3. The cable sleeve according to claim 1 wherein the annular seal is supported on a circumferential surface of an edge of the seal member via a surrounding inwardly directed surface of said at least one supporting ring.

4. The cable sleeve according to claim 1 wherein an encompassing sealing lip is arranged at an outwardly residing end of the sealing surface of the flange seal that is directed against the flange of the envelope member.

5. The cable sleeve according to claim 1 wherein the annular seal comprises a U-shaped cross-section; one U-leg of the annular seal being designed as said flange seal and arranged in the channel of the straining ring together with the flange of the envelope member; a base of the U-shaped annular seal being inserted as said channel seal in the seal channel of the seal member, a second U-leg of the annular seal being angled outwardly off as said at least one supporting ring; a channel edge of the straining ring being lengthened as a spring and enters into an interspace of the U-shaped annular seal; and the spring being angled outwardly off and pressing the at least one supporting ring of the annular seal onto a circumferential surface of the channel edge of a seal channel of the seal member.

6. A cable sleeve, comprising:
    an envelope member and at least one seal member with a seal channel and an annular seal retained at a seal end of the envelope member;
    a seal end of the envelope member comprising an outwardly directed, encompassing and conically beveled flange that, together with the seal, is held by a straining ring that has an inwardly directed channel with sidewalls;
    the annular seal being formed of a channel seal that fills out the seal channel of the seal member and of a flange seal that projects into the channel of the straining ring and abuts against a sidewall of the flange of the envelope member;
    at least one supporting ring between the channel seal and the flange seal; and
    the annular seal being formed of an elastomer having a Shore hardness of equal to or greater than 40°.

* * * * *